W. H. EYERMANN.
MEANS FOR SECURING TURBINE BLADES.
APPLICATION FILED DEC. 10, 1909.

952,317.

Patented Mar. 15, 1910.

UNITED STATES PATENT OFFICE.

WILHELM HEINRICH EYERMANN, OF DEUTSCH WILMERSDORF, NEAR BERLIN, GERMANY.

MEANS FOR SECURING TURBINE-BLADES.

952,317.  Specification of Letters Patent.  Patented Mar. 15, 1910.

Application filed December 10, 1909. Serial No. 532,443.

*To all whom it may concern:*

Be it known that I, WILHELM HEINRICH EYERMANN, engineer, a subject of the German Emperor, and resident of Holsteinischestrasse 4, Deutsch Wilmersdorf, near Berlin, Germany, have invented new and useful Improvements in Means for Securing Turbine-Blades, of which the following is a specification.

This invention relates to the fixing of the blades of turbines and like rotating wheels.

The method hitherto employed for fixing turbine blades by causing them to engage by means of a feather and groove with an annular channel cut in the rotating disk or blade-bearing member, the engagement being insured by the use of a key or wedge, has the drawback that unless the coöperating parts are very accurately formed the blade is only kept rigid by the friction of the key or wedge, and under the action of great stresses it may move to some extent with injurious effects. This drawback is avoided according to this invention by making the channel with an oblique or slanting wall on one side as in a onesided dovetail.

Figure 1:
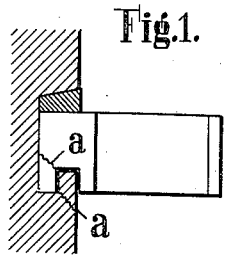
Figure 2:
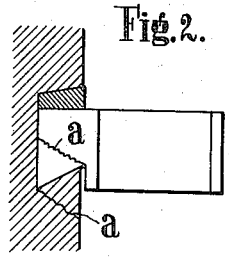
Figure 3:
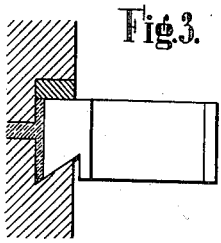
Figure 7:
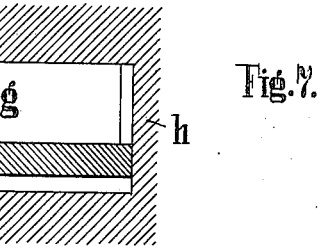

In the accompanying drawings—Figure 1 shows in section a part of a turbine wheel, showing the old method of securing the blades therein. Fig. 2 is a similar view, showing one form of my improved means for securing the blades in a turbine wheel. Figs. 3, 4, 5 and 6 are similar views, showing modified forms. Fig. 7 is a cross section of a holding disk or wheel, in which the blades are fixed for the purpose of machining or grinding them.

While in the case of a feather and groove connection, such as is illustrated in Fig. 1 of the accompanying drawings, an axial movement of the blade to the extent of the inaccuracy of manufacture is possible even when the key or wedge is driven in with force, in the case of the channel being formed with an oblique wall (see Fig. 2) the blade is forced by the insertion of the key or wedge against the bottom of the channel and also against the oblique wall and is held fast between those two surfaces. If the key is wedge-shaped small inaccuracies in the width of the channel can be compensated for. A further advantage of the new shape of the channel is the increased strength of the connection, as may be seen on comparing Fig. 1 and Fig. 2. In Fig. 1 the breaking line $a$ is only half as large as the corresponding surface in Fig. 2, all other dimensions being equal.

Figure 4:
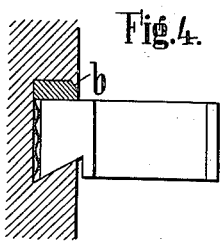

If the wedge be driven in with great force injurious strains may be produced in the disk or blade-carrying member. In order to avoid this the key is preferably made with parallel sides, and inaccuracies in the dimensions of the channel are compensated for by causing the blade to be forced outward after the introduction of the key by pressure from the bottom of the channel. In this way proper contact between the blade, the channel wall, and the key is insured. This result can be obtained, for example, by placing under the blades a compressed plastic substance or liquid which subsequently solidifies (see Fig. 3), or by inserting a spring, as in Fig. 4. The key can be prevented from falling out, as shown in Fig. 4, by riveting over the edge of the material forming the disk, as at $b$.

Figure 5:
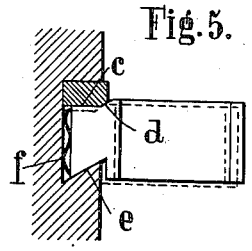
Figure 6:
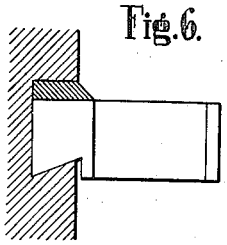

Fig. 5 shows a modified method of securing a disk according to this invention, by which the blades are readily removed or secured in place. The side of the blade engaging with the key is provided with a machined face $c$ slightly offset relatively to the surface of the blade, and the outer end $d$ of this face $c$ is made parallel to the oblique surface $e$. If the blade be pressed, against the action of the spring $f$, against the bottom of the channel into the position shown in dotted lines it will afford sufficient space for the introduction of the key. If it is then released it will slide outward under the action of the spring $f$ along the oblique surfaces $d$ and $e$, and the surface $d$ will overlap the end of the key and prevent it from falling out. The side of the key adjacent to the blade may be made of greater length than the other side, thus supporting the blade at a point as far as possible outside the blade-bearing member or disk, at the same time leaving space for the head of the adjacent blade (see Fig. 6).

In the methods of fastening above mentioned there is no necessary absolute agreement between the cross-sectional area of the channel and those of the blade and the key, but in order to secure uniformity it is advisable to machine the feet or securing surfaces of all the blades forming one circumferential set in one operation. To this end the blades $g$ (Fig. 7) are inserted in a reversed position into an annular groove in a chuck $h$ and are pressed outward against the side of the groove by means of a spring ring $i$ similar to a piston ring. The blades are thus held fast during the turning, milling or grinding of the feet of the blades.

Claims.

1. The combination of a turbine wheel provided with one-sided dovetailed slots and blades provided with a one-sided dovetailed foot adapted to fit therein, and keys for securing said blades in place, substantially as described.

2. The combination of a turbine wheel provided with one-sided dovetailed slots, blades, each provided with a one-sided dovetailed foot, keys for securing said blades in said slots, and means in the bottom of said slots tending to force the ends of said blades outward, substantially as described.

3. The combination of a turbine wheel provided with one-sided dovetailed slots, blades, each provided with a one-sided dovetailed foot, a spring in the bottom of each of said slots, and a key engaging the foot of each of said blades, substantially as described.

4. The combination of a turbine wheel provided with one-sided dovetailed slots, blades, each provided with a one-sided dovetailed foot, having a machined face parallel, when inserted in position, to the inclined face of the dovetailed slot of the wheel, a key for each of said blades, said key being held in position by the offset of the blade, and a spring normally tending to force said blade outward, substantially as described.

Dated this 26th day of November 1909.

In testimony, that I claim the foregoing as my invention, I have signed my name in presence of two witnesses.

WILHELM HEINRICH EYERMANN.

Witnesses:
 WOLDEMAR HAUPT,
 HENRY HASPER.